UNITED STATES PATENT OFFICE.

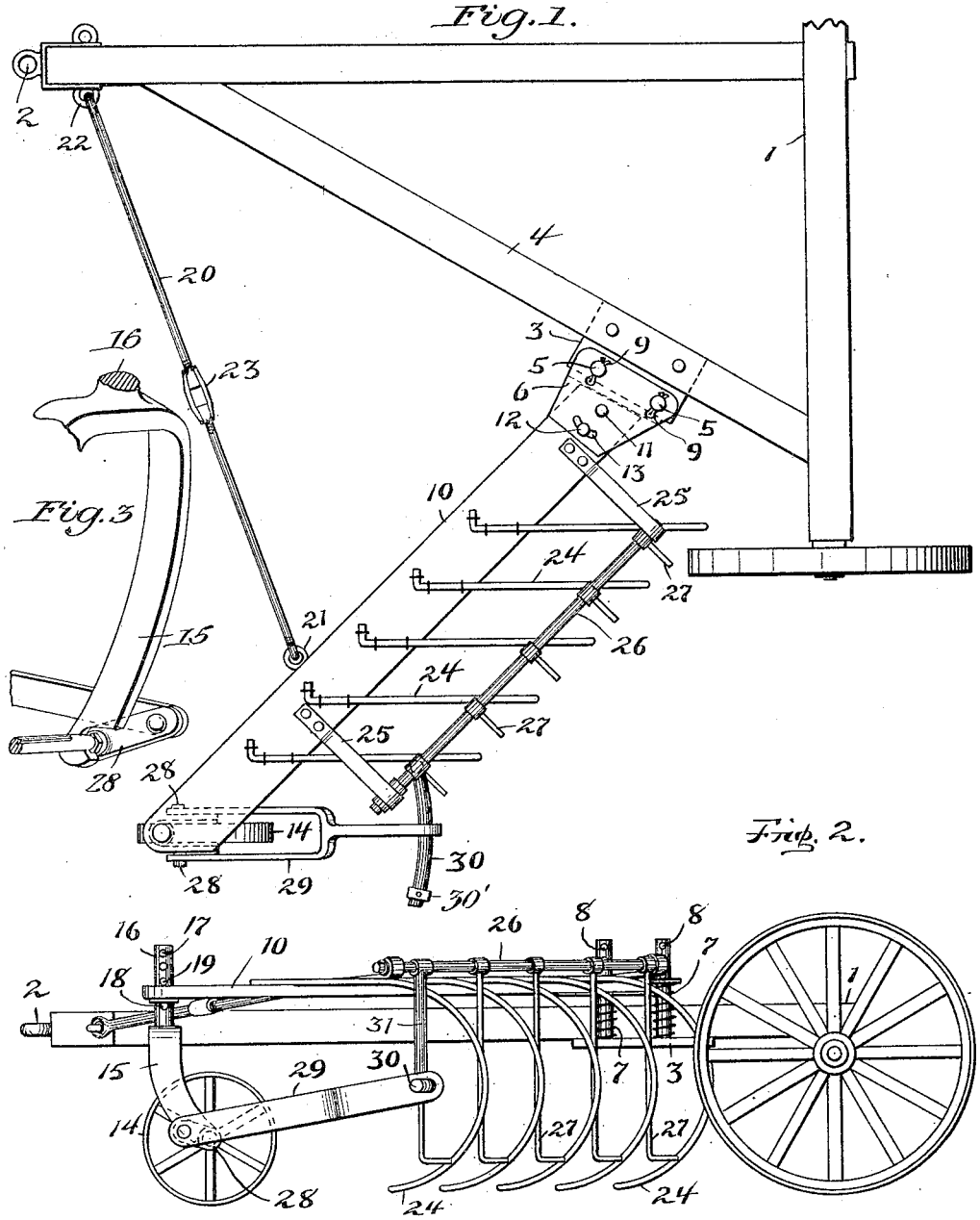

JOSEPH C. WEAVER, OF ZANESVILLE, INDIANA.

SIDE RAKE ATTACHMENT FOR HAY-LOADERS.

1,134,171.  Specification of Letters Patent.  Patented Apr. 6, 1915.

Application filed April 4, 1914. Serial No. 829,677.

*To all whom it may concern:*

Be it known that I, JOSEPH C. WEAVER, a citizen of the United States, residing at Zanesville, county of Allen, and State of Indiana, have invented certain new and useful Improvements in Side Rake Attachments for Hay-Loaders of which the following is a specification.

This invention relates to an attachment to be applied to hayloaders of ordinary construction, and is for the purpose of gathering hay that has fallen from the wagon during the loading process, and also for gathering hay usually left by the loader proper in turning corners, and conveying the hay so gathered into the path of the hayloader proper by which the hay is finally recovered and loaded upon the wagon to which the loader is coupled.

The objects of the invention are: first, to provide an apparatus of its kind having the necessary actuating means of operation by which its working parts are driven independently of the mechanism of the hayloader; and second, to provide an adjustable connection, and other adjustable features so that the apparatus may be held at a proper elevation above the ground and in suitable relation with the loader proper. These objects are accomplished by the construction illustrated in the accompanying drawings in which:

Figure 1 is a plan view of the device and showing also a portion of the hayloader to which it is attached; and Fig. 2 is a side elevation of the same. Fig. 3 is a detail view to more plainly illustrate the connection between the pitman 29 and the wheel 14.

Similar characters of reference indicate corresponding parts in both views, and referring now to the same:

1 indicates a hayloader which is of known construction and adapted to be attached to and drawn by the wagon, the connection being made at the coupling 2. A bracket 3 is secured to one of the beams 4 of the hayloader and has two studs 5 projecting vertically therefrom. A coupling plate 6 is loosely mounted upon the studs, and upon each stud is a spring 7 interposed between the plate and the bracket so that the latter is held upwardly by the pressure of the springs. Each stud has also a series of holes 8, adapted for the insertion of pins 9 for the purpose of limiting the upward play of the plate.

A beam 10 is connected to the plate 6 by a pivot bolt 11 and also by a cap screw or bolt 12 that extends through a slot 13 made in the plate, the latter allowing the bolt 12 to move therein when the beam is adjustably turned upon the pivot bolt 11. The outer end of the beam 10 is supported upon a trailer consisting of a ground-wheel 14 mounted in a swivel-bracket 15, the shank 16 thereof extending through the beam. A series of holes 17 are made through the shank through which a pin 18 may be inserted beneath the beam and a similar pin 19 above the beam, the beam being held between the pins.

A strut 20 is connected at one end to the beam 10 by means of an eye-bolt 21 and at its other end to the loader by means of an eye-bolt 22. The strut is provided with a turn-buckle 23 for adjustable altering its length so as to shift the angle of the beam 10 in relation to the loader.

The beam has attached thereto a series of rearwardly extending rake-teeth 24, and also two brackets 25. An oscillating shaft 26 is mounted in the outer ends of the brackets 25 and has fixed thereon a series of pendant fingers 27, the fingers being spaced so as to correspond with the spaces between the rake-teeth. Each of the fingers is bent backwardly at its lower end so that as the fingers are swung into the spaces between the rake-teeth, their ends will not pass farther forward than the line of the rake-teeth in the corresponding plane. The ground-wheel 14 has a crank 28 upon each side and a bifurcated pitman 29 is connected therewith so as to be actuated upon the rotation of the ground-wheel. The rear end of the pitman is slidably mounted in connection with a curved pin 30 that extends from a pendant-arm 31, the latter being fixed to the shaft 26. Through the action of the pitman the arm is swung to and fro and the shaft 26 thereby oscillated so that the fingers are repeatingly brought into the spaces between the rake-teeth. The pin 30 is curved so that as the trailer is swung, the pitman will slide upon the pin in the same arc, the center being the stud 16 upon which the bracket 15 turns.

In using this invention the apparatus is attached to the hayloader with the beam connected thereto substantially as described and the pins in the studs 8 are set in such of the holes in the studs as will admit of such elevation of the beam as will bring the rake-teeth in proper relation to the ground. A similar adjustment is also made between the beam and the shank of the trailer.

It will be noted that the apparatus extends to one side of the loader proper, it being the intention that as the loader is drawn in the rear of the wagon to which it is attached the rake will be drawn in a path parallel to that in which the wagon is moved, and any hay that falls from the wagon will be caught by the rake-teeth and diverted into the path of the loader so as to be gathered and loaded with the rest of the hay in the regular path of the loader. The fingers, in striking in the spaces between the rake-teeth tend to shift hay caught by the rake-teeth so that it moves successively from one tooth to the other on into the path of the loader. By forming the fingers with back turned ends, they may be pressed effectively into the spaces between the teeth without becoming entangled in the hay so as to claw it out between the teeth. The collar 30' prevents the end of the pitman 29 from sliding over the end of the arc-shaped rod 30 when the wheel 14 is turned to its extreme position.

By constructing the device so that it derives its actuating movement from the trailer, its operation is effected entirely independent of the mechanism of the loader proper.

What I claim is:—

1. In an appliance of the class described a beam having attached thereto a series of rake-teeth, a hinged connection between the beam and the loader; an adjustable strut attached at one end to the beam and the other to the loader; an oscillating beater mounted in connection with the beam, the fingers of which are adapted to swing into the spaces between the rake-teeth; a ground wheel supporting the outer end of the beam; a crank on the ground-wheel of the trailer; a pitman actuated by the crank; and an arm on the beater having connection with the pitman to be actuated thereby.

2. In an appliance of the class described a supporting bracket attached to the loader proper and having vertical studs; a beam having a plate at its inner end fitting upon the studs; springs on the studs interposed between the plate and the bracket; a ground wheel at the outer end of the beam upon which the latter is adjustably supported; a strut connecting the beam with the loader; a series of rake-teeth carried by the beam; an oscillating beater the fingers of which are adapted to work between the rake-teeth; and means in connection with the ground wheel to actuate the beater.

3. In an appliance of the class described, a beam supported at one end by the loader; a swiveled ground wheel supporting the opposite end of the beam; a strut connecting the beam with the loader; a series of rake-teeth carried by the beam; a beater having fingers thereon adapted to work between the teeth; and means in connection with the ground wheel for actuating the beater.

4. In apparatus of the class described, a rake supported at one end by the loader; a ground wheel supporting the other end of the rake; an oscillating beater in connection with the rake; and actuating mechanism between the trailer and the beater for actuating the latter.

JOSEPH C. WEAVER.

Witnesses:
H. G. KUGHN,
R. V. STILES.

Copies of this patent may be obtained for five cents each, by addressing the "Commissioner of Patents, Washington, D. C."